United States Patent
Hopkinson et al.

(10) Patent No.: US 11,866,555 B1
(45) Date of Patent: Jan. 9, 2024

(54) CROSSLINKED POLYPHOSPHAZENE BLENDS FOR GAS SEPARATION MEMBRANES

(71) Applicant: Energy, United States Department of, Washington, DC (US)

(72) Inventors: David Hopkinson, Morgantown, WV (US); Victor Armanda Kusuma, Pittsburgh, PA (US); Surendar R. Venna, Missouri City, TX (US); Joshua S. McNally, Idaho Falls, ID (US); Christopher J. Orme, Firth, ID (US); Frederick F. Stewart, Idaho Falls, ID (US)

(73) Assignee: Energy, United States Department of, Washington, DC (US)

( * ) Notice: Subject to any disclaimer, the term of this patent is extended or adjusted under 35 U.S.C. 154(b) by 1178 days.

(21) Appl. No.: 16/543,928

(22) Filed: Aug. 19, 2019

(51) Int. Cl.
| | |
|---|---|
| *B01D 53/22* | (2006.01) |
| *C08G 79/025* | (2016.01) |
| *C08L 85/02* | (2006.01) |
| *C08K 5/37* | (2006.01) |
| *C08K 5/548* | (2006.01) |
| *C09B 47/04* | (2006.01) |
| *C08L 81/06* | (2006.01) |
| *C08L 71/08* | (2006.01) |
| *B01D 53/14* | (2006.01) |
| *B01D 71/58* | (2006.01) |
| *C08L 79/08* | (2006.01) |

(52) U.S. Cl.
CPC ....... *C08G 79/025* (2013.01); *B01D 53/1475* (2013.01); *B01D 71/58* (2013.01); *C08K 5/37* (2013.01); *C08K 5/548* (2013.01); *C08L 71/08* (2013.01); *C08L 79/08* (2013.01); *C08L 81/06* (2013.01); *C08L 85/02* (2013.01); *C09B 47/04* (2013.01); *B01D 2256/24* (2013.01); *B01D 2257/504* (2013.01); *C08L 2312/00* (2013.01)

(58) Field of Classification Search
CPC .................. B01D 53/228; B01D 53/62; B01D 2258/0283
See application file for complete search history.

(56) References Cited

U.S. PATENT DOCUMENTS

| | | | |
|---|---|---|---|
| 4,055,520 A | 10/1977 | Dieck et al. | |
| 4,710,204 A | 12/1987 | Kraus et al. | |
| 4,728,345 A | 3/1988 | Murphy | |
| 4,783,202 A | 11/1988 | Kraus et al. | |
| 4,816,532 A | 3/1989 | Chang | |
| 5,457,160 A | 10/1995 | Allcock et al. | |
| 5,464,932 A | 11/1995 | Allcock et al. | |
| 7,074,256 B2 | 7/2006 | Stewart et al. | |
| 8,313,771 B2 | 11/2012 | Song et al. | |

FOREIGN PATENT DOCUMENTS

| | | | |
|---|---|---|---|
| WO | WO 2016118581 | * | 7/2016 |

OTHER PUBLICATIONS

Sekizkardes et al Microporous polymeric composite membranes with advanced film properties: Pore intercalation yields excellent CO2 separation performance, J. Mater. Chem. A 2018, 6 (45), 22472-22477, published on Nov. 2018.*
Jha et al Characterization of Substituted Polyphosphazene Membranes—Pure and Mixed Gas Results, Ind. Eng. Chem. Res. 2006, 45, 6570-6577, published on Sep. 2006.*
Orme et al Characterization of 2-(2-Methoxyethoxy)ethanol Substituted Phosphazene Polymers Using Pervaporation, Solubility Parameters, and Sorption Studies, Journal of Applied Polymer Science, vol. 97, 939-945 (2005), published on May 2005.*
Allcock; Crosslinking Reactions for the Conversion of Polyphosphazenes into Useful Materials; Chem. Mater. 1994, 6, 1476-1491.
Allcock et al.; Polyphosphazenes with etheric side groups prospective biomedical and solid electrolyte polymers; Macromolecules 1986, 19, 1508-1512.
Huang et al.; Study of crosslinking of polyphosphazene with allyl pendant groups initiated by benzoyl peroxide; Journal of Applied Polymer Science, vol. 113, 2353-2360 (2009).
Jankowsky, et al.; Preparation and electrochemical performance of polyphosphazene based salt-in-polymer membranes for lithium ion batteries; Journal of Power Sources 253 (2014) 256-262.
Kusuma, et al.; Crosslinked poly(ethylene oxide) containing siloxanes fabricated through thiol-ene photochemistry; Journal of Polymer Science, Part A: Polymer Chemistry 2015, 00, 000-000.
Orme, et al.; Characterization of gas transport in selected rubbery amorphous polyphosphazene membranes; Journal of Membrane Science 186 (2001) 249-256.
Orme, et al.; Gas permeability in rubbery polyphosphazene membranes; Journal of Membrane Science 280 (2006) 175-184.
Venna, et al.; Polyphosphazene polymer development for mixed matrix membranes using SIFSIX-Cu-2i metal organic frameworks; Journal of Membrane Science 535 (2017) 103-112.

* cited by examiner

*Primary Examiner* — Gregory Listvoyb
(74) *Attorney, Agent, or Firm* — Aaron R. Keith; Jacob A. Heafner; Michael J. Dobbs

(57) ABSTRACT

The disclosed invention relates to a composition comprising a crosslinked blend of polyphosphazene polymers. The composition comprises a first polyphosphazene and a second polyphosphazene, where the first polyphosphazene and the second polyphosphazene being bound by a thiol bearing crosslinking agent. Such compositions are useful as a membrane material for the separation of gasses in a gaseous mixture.

9 Claims, 7 Drawing Sheets

CROSSLINKED POLYPHOSPHAZENE BLENDS FOR GAS SEPARATION MEMBRANES

GOVERNMENT INTEREST

The United States Government has rights in this invention pursuant to the employer-employee relationship of the Government to the inventors as U.S. Department of Energy employees and site-support contractors at the National Energy Technology Laboratory. Support for this invention was also provided under Contract No. DE-AC07-05-ID14517 between the U.S. Department of Energy and Battelle Energy Alliance, LLC, as operator of the Idaho National Laboratory.

FIELD OF THE INVENTION

The disclosed invention relates to a composition comprising a crosslinked blend of polyphosphazene polymers. The composition comprises a first polyphosphazene and a second polyphosphazene, where the first polyphosphazene and the second polyphosphazene being bound by a thiol bearing crosslinking agent. Such compositions are useful as a membrane material for the separation of gasses in a gaseous mixture.

BACKGROUND OF THE INVENTION

In 2017 about 35 gigatons of carbon was released into the atmosphere in the form of gaseous carbon dioxide ($CO_2$). $CO_2$, a greenhouse gas and an acid gas, has the ability to trap heat and prevents it from leaving the atmosphere, currently, representing about 80% of all greenhouse gas emissions, and when mixed with water becomes a corrosive acid. The escalating $CO_2$ concentration causes an increase in global temperature, acidification of oceans, and detrimental environmental changes, which causes more release of $CO_2$. A positive feedback cycle forms, where increasing $CO_2$ causes more $CO_2$ emissions. A major source of $CO_2$ is in the industrial sector more specifically fuel and energy development. The combustion of carbon based fuels in power generation plants produces flue gas, containing $CO_2$ and other contaminants such as sulfur and nitrogen oxides. A demand exists in removing and reducing $CO_2$ emissions. Current research and development is aimed at capturing and sequestering $CO_2$ from flue gas therein removing $CO_2$ before it reaches the environment.

Government regulations and policy imposes strict industry standards for $CO_2$ emission, With projected trends in $CO_2$ emissions expected to grow 2% annually more regulations will be enforced. Innovative technology that efficiently and economically separates $CO_2$ from a gaseous sample is needed.

Developments in post-combustion carbon capture including liquid and solid absorption, mineralization, and membrane separation. Solvent based absorption is commercially used with flue gas by passing it through solution(s) that extract $CO_2$. This method is efficient, but due to high energy cost it's not a long term solution. Mineralization requires additional reactions and time to convert flue gas into a solid form, also not a long term solution. Membranes offer compactness, modularity, ease of installation, low maintenance and energy cost. However, membranes are ideally used in bulk separation with concentrated gasses and have suboptimal parameters in selectivity or permeability. To overcome these challenges, ongoing research and development is probing membrane material design and synthesis in composing a membrane with desirable permeance and selectivity.

Membranes are usually made of flexible polymers that contour to various surfaces and allow molecules to pass through selectively, making them an ideal material to use. During gas separation the membrane must have enough strength to withstand the stress and strain without any damage. In general, membrane composition will determine not only its mechanical strength, but also its functional requirement.

Membrane theory states two major factors are responsible for molecule permeation 1) the pore size and 2) the interactions with the membrane. Specifically, molecules permeate the membrane through amorphous regions, micropores, attractive forces, and diffusion. The driving force is concentration and a pressure gradient created by flue gas composition and negative pressure usually formed by a vacuum on the permeate side of the membrane. An innovative chemical composition will select the type of gas that permeates and the flow rate of the membrane. Pore size is based on chemical composition, but also on the amount of crosslinking both intra and/or intermolecular interactions. Suitable membrane material include polymers without limitation polyvinylidene fluoride, polypropylene, cellulose, polysulfone, polycarbonate, polyimide, polyamide, polyethylene, polysiloxanes, polyetheretherketone, polytetrafluoroethylene, etc., and combinations thereof.

Polymers are commonly composed of a carbon backbone in both natural and synthetic products. A different class of hybrid polymers are polyphosphazenes that have an alternating phosphorus and nitrogen backbone. The unusual nitrogen phosphorus bond is unsaturated with no delocalization of the double bond, therein having free rotation and flexibility. The polymer is synthesized from inexpensive material, phosphorus pentachloride and ammonium chloride, this forms the building block hexachlorophosphazene, which forms the inorganic backbone when heated. Through nucleophilic attack a halogen, usually chlorine, is removed and replaced by an organic molecule. Therein forming an organic inorganic hybrid polymer. Stage-wise addition of salts of organic molecules creates random arrays of functional groups with controllable overall proportions. These customizable monomeric units and organic groups enhance diversity and functionality of polyphosphazenes. This leads to a range of possible shapes without limitation that are branched, comb-like, and spherical or any combination thereof. In addition to the shape, the phosphorus atom is more versatile and diverse than standard carbon based polymer due the different possible substituted groups (R groups) that may be attached, forming heteropolymers and homopolymers. This gives phosphazenes a range of unique function and with possible applications as flame retardants, sealants, gaskets, ion transfer in batteries, membranes, medical applications, and many more.

Membranes need to withstand the harsh environment produced by flue gas from power generating plants. Combusting fossil fuels or other rich hydrocarbon sources produces flue gas, which is concentrated $CO_2$ and other contaminant gases in depleted air. Captured flue gas is at a high temperature with fluctuating pressure. This environment may cause the membrane to breakdown and lose its properties. The polyphosphazene based composition described herein has demonstrated the physical strength to handle such environment while possessing permeability and selectivity suitable for gas separation operations.

SUMMARY OF THE INVENTION

The disclosure describes a composition comprising a crosslinked polyphosphazene polymer blend. The composition uses as a material to form membranes for gas separation membranes, for example to separate $CO_2$ from the flue gas of fossil-fueled power plants. The composition comprises a first polyphosphazene and a second polyphosphazene, where the first polyphosphazene and a second polyphosphazene are bound by a crosslinking agent. The first polyphosphazene has heterogeneous sidegroups comprising both aryloxy and ethoxylate groups, and a crosslinking side group. The second polyphosphazene comprises aryloxy groups with small amount of crosslinking side group. In one embodiment, the first polyphosphazene is present in a wt % ranging from about 75 wt % to about 99 wt %, the second polyphosphazene is present in a wt % ranging from about 1 wt % to about 25 wt %, and the crosslinking agent is present in a wt % ranging less than 5 wt %. The composition has particular use as a material for a membrane for gas separation operations such as for separating $CO_2$ from flue gas for $CO_2$ sequestration. Because the membrane composition is crosslinked, it has the advantage of increased mechanical durability compared to uncrosslinked polyphosphazene polymer materials or uncrosslinked polyphosphazene polymer blends.

Still another object of one or more embodiments is to provide gas separation membrane comprised of the above composition. Membranes made from the composition have demonstrated permeability of greater than 200 Barrer and greater than 30 $CO_2/N_2$ selectivity.

DETAILED DESCRIPTION OF THE INVENTION

Glassy type polymers are typically used in material applications because of transport properties, structural support, and electrostatic properties. These polymers have at least two states of matter a solid, glassy state, and a liquid, viscous state, that is determined by the transition temperature, Tg. Below Tg, the polymer behaves as solid-like while, above Tg, will adopt a liquid-like state. The Tg dictates many physical properties of polymers important for various applications. Some polymer may crystallize, rendering solid-like properties to an otherwise liquid-like material. For example, polyethylene has very low Tg but is solid at room temperature due to crystallinity. Crosslinking also renders an otherwise liquid-like material solid, for example silicone rubber. With respect to the polyphosphazenes, because both components of the polyphosphazenes are above Tg at room temperature, but a combination of crosslinking and crystallinity render the product solid.

Barrer is the measure of gas permeability through a membrane. The higher the Barrer unit the greater amount of gas will permeate the membrane.

Figure 1:
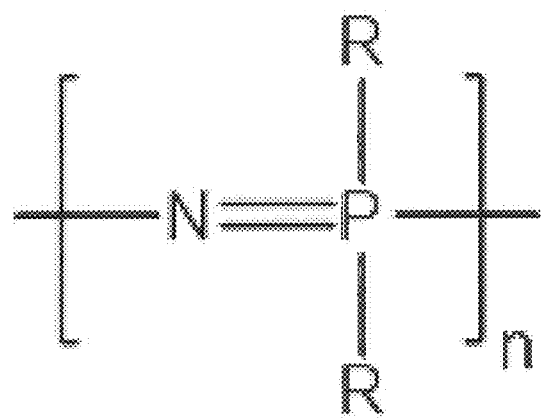
FIG. 1: Illustrates a chemical structure of a first polyphosphazene.

Polyphosphazenes are hybrid polymers composed of an inorganic backbone with alternating nitrogen phosphorus bonds as can be seen in FIG. 1. The phosphorus atom(s) may be substituted with two or more R groups, typically through nucleophile attack reactions. The substitution of various organic groups of the monomer unit provides a diversity of possible structures and unique functions. Post polymerization, the various R group substitutions may be scattered randomly across the polymer. Thus, a single monomer may have four different R groups ($R_1$, $R_2$, $R_3$, and $R_4$) or any one or a combination of the various R groups.

The substituted R groups are nucleophiles and will influence both mechanical and chemical properties. In $CO_2$ separation operations, ethoxy groups interact with $CO_2$. Increasing the amount of ethoxylates substituted on phosphazene enhances $CO_2$ selectivity, but reduces the Tg and mechanical durability. The phenoxy groups have moderate $CO_2$ selectivity but increased Tg and allowable mechanical durability. With a substituted phenoxy group, for example adding an allyl or methoxy group increased $CO_2$ selectivity without loss in mechanical durability. A hydrocarbon either branched or straight chain configuration with an allyl or alkyne group attached may be substituted on the phenoxy. Heteroatoms, for example, nitrogen, sulfur, oxygen, phosphorous, fluorine, chlorine, bromine, and iodine are also possible substituents.

Accordingly, polyphosphazenes substituted with 2-allylphenol (AP), 4-methoxyphenol (MEOP), methoxyethoxy ethanol (MEE), and phenoxy were evaluated for gas separation applications. Methoxyethoxy ethanol substituted polyphosphazenes have excellent gas separation, but poor mechanical stability with a low Tg forming a liquid-like membrane, 4-methoxyphenol and phenoxy have improved mechanical stability with a high Tg, but have poor gas separation properties. However, the crosslinkable allyl groups present (and any alkyne substitutions) may he crosslinked by thiol-ene reactions to further enhance mechanical durability.

Figure 2:
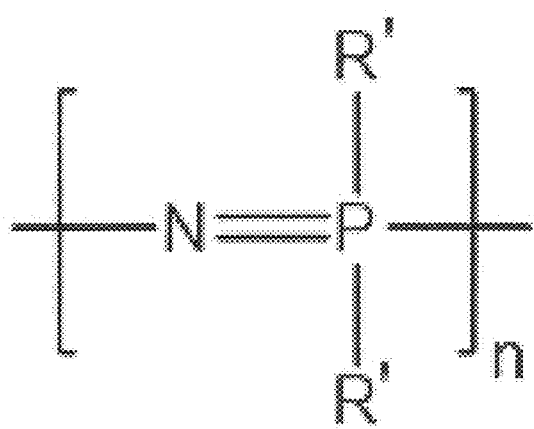
FIG. 2: Illustrates a chemical structure of a first polyphosphazene.

The present disclosure provides a composition comprising a crosslinked blend of at least two dissimilarly substituted polyphosphazenes to provide a membrane with both excellent gas separation qualities and high mechanical stability. The composition comprises a first polyphosphazene featuring a heterofunctional polyphosphazene $[N—PR_1R_2—N—PR_3R_4]_n$ where $R_1$, $R_2$, $R_3$ and $R_4$ can be combinations of aryloxy (—O—($C_6$-$C_{12}$) phenolic) functional groups and ethoxylate groups (having the general formula —O($CH_2CH_2O)_N$R wherein N is 1 to 10 and R any hydrocarbon), a second polyphosphazene (FIG. 2) where $R_1'$ and $R_2'$ groups are aryloxy groups, and where at least a portion of the first polyphosphazene and the second polyphosphazene are bound by a crosslinking agent where the crosslinking agent binds to the polyphosphazenes through thiol-ens reaction with the crosslinkable functional groups. In turn, crosslinkable functional groups present in the polyphosphazenes prior to crosslinking are crosslinked functional groups after undergoing crosslinking via thiol-ene reaction with the crosslinking agent. Where the crosslinkable functional group is 2-allylphenol prior to crosslinking, for example, the functional group bonds to the crosslinking agent and the now crosslinked functional group was the 2-allylphenol.

With respect to the first polyphosphazene, R groups may be homogenous or heterogeneous on any single monomer. In one embodiment, a portion of R may be the aryloxy methoxyphenoxy. In a preferred embodiment, a portion of R is 4-methoxyphenoxy (MEOP). Another portion of R may be allylphenol. In a preferred embodiment, a portion of R is the allylphenol 2-allylphenoxy (2-AP)(prior to crosslinking). In one preferred embodiment, a portion of R is the ethoxylate group 2-(2-methoxyethoxy) ethanol (MEE).

With respect to the first polyphosphazene, R groups comprise 50% to 95% ethyloxylate, 5% to 50% aryloxy, and where at least a portion of R comprises a crosslinkable functional group. In one embodiment, the crosslinkable functional group comprises 2-AP (prior to crosslinking). As noted, any monomer across the first polyphosphazene may have any one or combination of the R constituents, thus, the constituents are randomly distributed.

Figure 3:
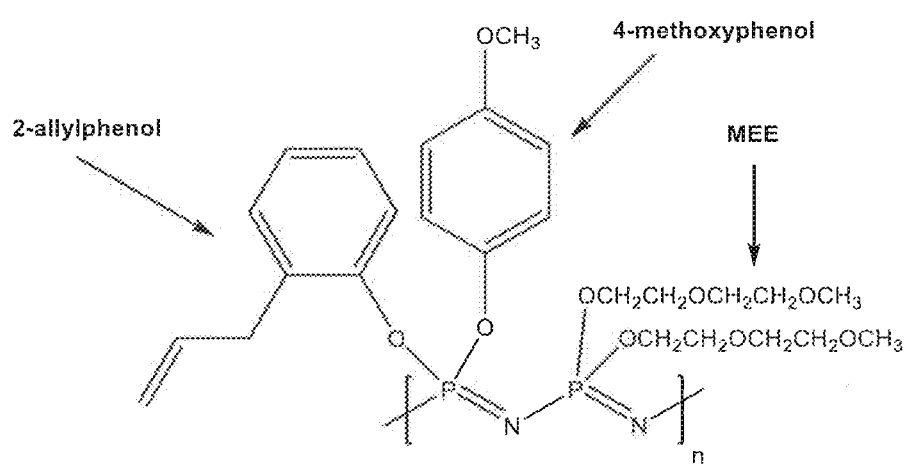
FIG. 3: Illustrates a chemical structure of a first polyphosphazene wherein a copolymer polyphosphazene backbone is substituted with 4-methoxyphenol ($R_1$), 2-allylphenol ($R_2$), and methoxyethoxy ethanol ($R_3$ & $R_4$).

With respect to the second polyphosphazene, R' groups comprise primarily aryloxy groups and up to about 5% crosslinkable functional group (crosslinked after undergoing crosslinking with the crosslinking agent). As with the first polyphosphazene any monomer across the first polyphosphazene may have any one or combination of the R constituents, thus, the constituents are randomly distributed Membranes comprising the first polyphosphazene alone (80% MEE, 15% MEOP, and 5% 2-AP as illustrated in FIG. 3) demonstrated excellent $CO_2$ permeation of around 530 Barrer and good selectivity 33 $CO_2/N_2$, but poor mechanical properties and is a semi-solid with low Tg, making any industrial membrane use difficult. Conventional thermal-initiated free-radical polymerization increased mechanical rigidity and reduced $CO_2$ permeability to 340 Barrer but the membrane became too brittle for practical application.

Figure 4:
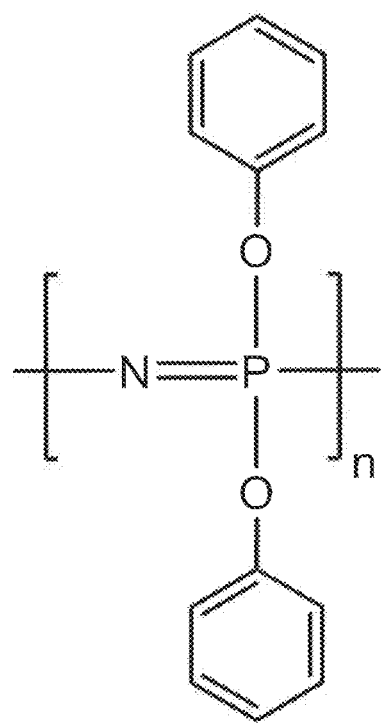
FIG. 4: Illustrates a chemical structure of a second polyphosphazene wherein $R_1'$ and $R_2'$ are substituted with phenoxy.

The second polyphosphazene comprises a single unit where $R_1'$ and $R_2'$ groups are both aryloxy groups. $R_1'$ and $R_2'$ may be same or different. The phenolic group may be substituted. However, at least a portion of R must comprise a crosslinkable functional group capable of facilitating crosslinking via the thiol-ene reaction with the crosslinking agent. In a preferred embodiment, $R_1'$ is aryloxy. In another embodiment, $R_1'$ and $R_2'$ are aryloxy groups (FIG. 4). In a preferred embodiment, the second polyphosphazene is PPOP composed of 97% phenoxy and 3% 2-AP. PPOP alone displayed good mechanical strength, but provided low $CO_2$ permeability of about 16 Barrer. Exemplary possible substitution schemes of the first polyphosphazene and the second polyphosphazene are depicted in Table 1.

TABLE 1

A substitution scheme of first polyphosphazene (WEEP-PPZ) and second polyphosphazene (PPOP)

| Polymer/Blend | methoxyethoxy-ethanol (MEE) | 4-methoxyphenol (4-MEOP) | Phenoxy | 2-allylphenol (AP) |
|---|---|---|---|---|
| MEEP80-PPZ | 80% | 15% | 0% | 5% |
| MEEP95-PPZ | 95% | 0% | 0% | 5% |
| PPOP-PPZ | 0% | 0% | 97% | 5% |

Polymers may be blended together to combine physical and chemical characteristics. With limitation in chemical modifications, blending of polymers expands on innovative physical properties. The successfulness of a polymer blend will depend on molecular interactions, hydrogen bonding, dipole-dipole, and hydrophobic interactions, between the polymers. If molecular interactions are unfavorable the blend will separate or form a semi-separated polymer with highly variable properties.

Blending of the first and second polyphosphazenes may be performed by dissolving the polymers in solvent, usually benzene, tetrahydrofuran, acetone, or any combinations thereof. Non-covalent interactions, if favorable, will hold the polymers together; however, crosslinking and blending is another method to combine the polymers to maximize the benefit of their different properties.

Figure 5:
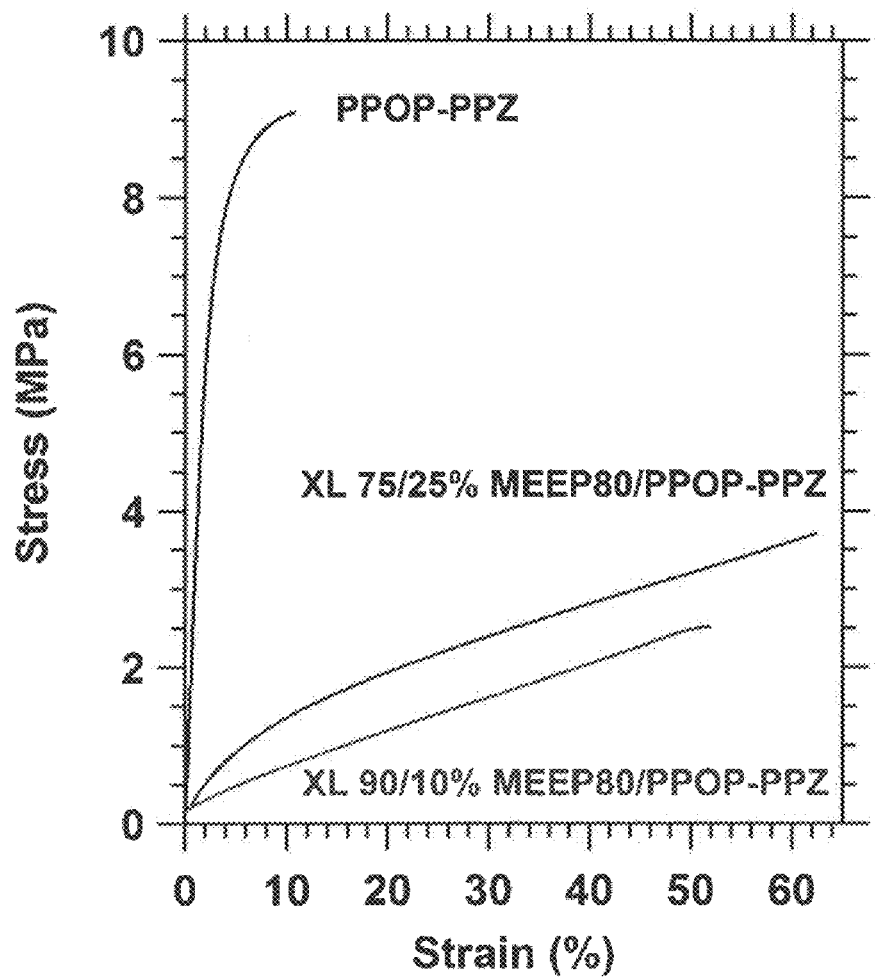
FIG. 5: Depicts a graph of Stress (%) vs. Strain (%) of two crosslinked polyphosphazene blend membranes and a second polyphosphazene membrane.

Crosslinking may be accomplished by three methods: thermal, high energy radiation, or enzymatic reaction. With thermal reaction, the advantageous properties of the starter materials may degrade due to the reactive nature of allyl groups, such as chain transfer and could damage the product. Enzymatic reactions require an amino acid as the R group and need to be further purified.

in contrast, crosslinking via thiol-ene reaction using low intensity UV light and a sensitizer is highly efficient. Thiols may be used to crosslink polymers via the allyl functional groups under exposure to UV light. The covalent crosslinked bonds are stronger than non-covalent interactions therein helping the blended polymers form a uniform membrane. Meanwhile, crosslinking increases mechanical durability. As shown in FIG. 5, crosslinking of the blend (XL 75/25% MEEP80/PPOP-PPZ and XL 90/10% MEEP80/PPOP-PPX) provides increased strain at failure in comparison to the second polyphosphazene PPOP-PPZ, indicative of better flexibility, while the first polyphosphazene MEEP80-PPZ alone was too weak for testing when performed using a TA Instruments Q800 DMA at 40° C. As a result, the crosslinked blend materials imparts better mechanical muchness of PPOP-PPZ on to the flexible MEEP80-PPZ. crosslink While photopolymerization is an effective method to initiate crosslinking, the thiol-ene reaction may he initiated through a thermal method, or a base catalyst can be used. Further, initiators such as DMPA may be incorporated to facilitate photocuring.

Figure 6:
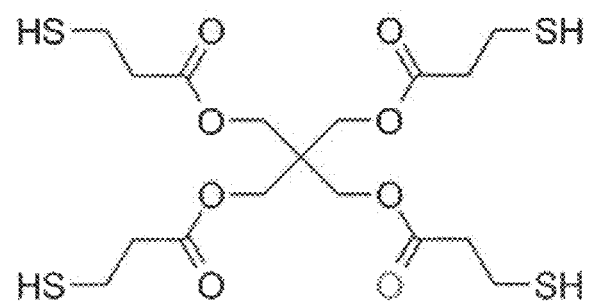
FIG. 6: Illustrates a chemical structure of the tetrathiol crosslinking agent pentaerythritol tetrakis(mercaptopropionate).
Figure 7:
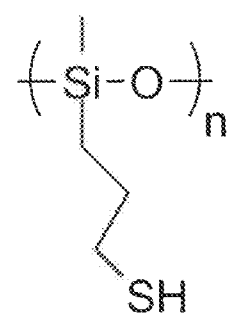
FIG. 7: Illustrates a chemical structure of the thiosiloxane crosslinking agent poly((mercaptopropyl)methylsiloxane).

Crosslinking agents as disclosed herein include compounds with two or bearing two or more thiol-groups capable of undergoing thiol-ene polymerization. After undergoing a crosslinking reaction, the crosslinking agents are bound via the thiol-ene reaction to the first and second polyphosphazenes to form a crosslinked polymer blend. A preferred crosslinking agent is a tetrathiol. A preferred tetrathiol crosslinking agent is pentaerythritol tetrakis(mercaptopropionate) (FIG. 6). Another preferred crosslinking agent are the thiosiloxanes. A preferred thiosiloxane are poly((mercaptopropyl)methylsiloxane) (FIG. 7). having a MW ranging from about 4000 to about 7000.

Composition Blends:

Blending the first polyphosphazene and the second polyphosphazene and crosslinking them provides a composition which when used as a gas separation membrane provides both acceptable $CO_2$ permeation and mechanical durability. Membranes described in Table 2 were fabricated for evaluation. Tetrahydrofuran was used to dissolve the polymers, followed by mixing them together along with the crosslinking agent in the specified ratios. The blend was cast onto a smooth glass surface preferable. The solvent was removed and a polymer film, 100 micrometers, was left. Films less than one micrometer thick may be cast on a porous polymeric support Ultraviolet light was then used to initiate crosslinking of the polymers.

Within the disclosure, the first polyphosphazene is present in a range wt % ranging from about 75 wt % to about 99 wt % and the second polyphosphazene is present in a wt % ranging from about 1 wt % to about 25 wt %, and the crosslinking agent is present in an amount less than about 5 wt %. In a preferred blend. A most preferred blend is present about 90 wt % first polyphosphazene, where the first polyphosphazene comprises 95 wt % methoxyethoxy-ethanol and 5 wt % 2-allylphenol, about 10 wt % second polyphosphazene where the second polyphosphazene comprises of about 97 wt % phenoxy and about 3 wt % 2-allylphenol, and where the crosslinking agent is a thiosiloxane. Table 2 provides presents compositions providing membranes with excellent selectivity and permeability.

Gas Separation Membranes:

The composition has use as a material to form membranes for gas separation membranes, for example to separate $CO_2$ from the flue gas of fossil-fueled power plants. An embodiment of this membrane comprises the crosslinked polyphosphazene polymer blend. The composition comprises a first polyphosphazene and a second polyphosphazene, where the first polyphosphazene and the second polyphosphazene were bound by a crosslinking agent where the crosslinking agent comprised two or more thiol groups for binding the polyphosphazenes through a thiol-ene reaction. The first polyphosphazene is a polyphosphazene where R1 and R2 are aryloxy groups and $R_3$ and $R_4$ are ethoxylate groups. The second polyphosphazene $[N—PR_1'R_2']_n$ has $R_1'$ and $R_2'$ aryloxy groups. In one embodiment, the first polyphosphazene is present in a wt % ranging from about 75 wt % to about 99 wt %, the second polyphosphazene is present in a wt % ranging from about 1 wt % to about 25 wt %, and the crosslinking agent is present in a wt % ranging less than 5 wt %.

The blended crosslinked polyphosphazene membrane offers a great advantage in efficient and economical method to remove $CO_2$ from flue gas. Polyphosphazene membranes are highly gas permeable and the present introduction of ethoxylate groups greatly improves their $CO_2/N_2$ selectivity as compared to other polyphosphazenes. The method of synthesis for polyphosphazene also offers unprecedented control over their properties just by varying the compositions of the functional groups. High permeability allowed advanced membranes, suitable for the demands of economical carbon capture from flue gas, to be fabricated.

In an exemplary gas separation operation, the product flue gas from combusting hydrocarbon based fuel, which is at high temperature, is cooled and filtered to remove large particles and excessive gaseous contaminants such as mercury, sulfur oxides and nitrogen oxides. The flue gas is passed over a polyphosphazene membrane arranged in different shapes, preferably planar or a tubular hollow fiber, to maximize surface area contact. The membrane must be resistant enough from breaking and the chemical composition must selectively permeate $CO_2$ gas. A vacuum may be used on the filtered side to induce lower pressure. When $CO_2$ contacts the membrane there is a concentration and pressure gradient with surface interactions that drives it through the membrane. An effective membrane can mechanically withstand process conditions while maintaining its gas separation performance. This process may be repeated two or more times to increase $CO_2$ permeation. A cross sweep setup may be used wherein the filtered gas flows the opposite way to increase $CO_2$ permeation. The filtered $CO_2$ is then condensed and removed. After membrane contact the imperme-

TABLE 2 providing $CO_2/N_2/CH_4$ permeability and $CO_2/N_2$ & $CO_2/CH_4$ selectivity by blend %.

| MEEP-PPZ | Cross-linker | Composition (MEEP/PPOP) wt % | $CO_2$ perm. (barrer) | $N_2$ perm. [barrer] | $CH_4$ perm. [barrer] | $CO_2/N_2$ | $CO_2/CH_4$ |
|---|---|---|---|---|---|---|---|
| MEEP80 | Tetrathiol | 100/0 | 475 | 14.5 | — | 33 | — |
|  |  | 90/10 | 320 | 10 | — | 32 | — |
|  |  | 75/25 | 200 | 5.9 | — | 34 | — |
|  | Thiosiloxane | 100/0 | 500 | 14.5 | — | 34 | — |
| MEEP95 | Tetrathiol | 90/10 | 430 | 14.6 | 36 | 30 | 12 |
|  |  | 75/25 | 330 | 11.2 | 28 | 29 | 12 |
|  | Thiosiloxane | 90/10 | 610 | 17.7 | 63 | 35 | 9.7 |
|  |  | 75/25 | 390 | 11.5 | 40 | 34 | 3.7 | able gas may be filtered by additional membranes or exhausted into the environment.

The disclosed crosslinked polyphosphazene blend membranes provide $CO_2$ permeability greater than about 200 barrer and an $N_2$ permeability less than about 15.0 barrer. In a preferred embodiment, the membrane provides a $CO_2$ permeability greater than about 500 barrer. Additionally, the crosslinked polyphosphazene blend membranes provide $CO_2/N_2$ selectivity greater than about 29. In a preferred embodiment, the membrane provides a $CO_2/N_2$ selectivity greater than about 35. The $CO_2/CH_4$ selectivity of the membranes is greater than about 9.0.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A gas separation membrane comprising a composition, the composition comprising at least a first polyphosphazene and a second polyphosphazene, wherein the first polyphosphazene has the formula

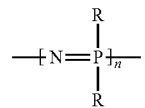

where R comprises 50% to 95% ethyloxylate and 5% to 50% aryloxy, and where at least a portion of R comprises a crosslinked functional group;

wherein the second polyphosphazene has the formula

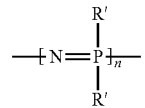

where R' are aryloxy groups, and where at least a portion of R'comprises a crosslinked functional group; and wherein the first polyphosphazene and the second polyphosphazene are bound by a crosslinking agent where the crosslinking agent comprises two or more thiol groups prior to undergoing crosslinking.

2. The membrane as recited in claim 1 where the first polyphosphazene is present in a wt % ranging from about 75 wt % to about 99 wt % and the second polyphosphazene is present in a wt % ranging from about 1 wt % to about 25 wt %.

3. The membrane as recited in claim 1 where the crosslinking agent is selected from the group consisting of a tetrathiol, thiosiloxane, or a combination thereof.

4. The membrane as recited in claim 1 wherein the membrane displays $CO_2$ permeability of greater than 200 Barrer.

5. The membrane as recited in claim 1 wherein the membrane has a $CO_2/N_2$ selectivity greater than 29.

6. The membrane as recited in claim 1 wherein the matrix is a polymer selected from the group consisting of phthalocyanine, polyimide, polysulfone, polyethylene glycol and combinations thereof.

7. A method for separating $CO_2$ gas from flue gas comprising:
   supplying a flue gas stream with a temperature and pressure;
   contacting the flue gas stream with the membrane of claim 1,
   allowing $CO_2$ to permeate through; and
   capturing the filtrate.

8. The method according to claim 7, wherein the selectivity for $CO_2/N_2$ is greater than 29.

9. The method according to claim 7, wherein greater than 200 Barrer $CO_2$ may be permeated.

* * * * *